United States Patent
Noguchi et al.

(10) Patent No.: US 8,497,009 B2
(45) Date of Patent: Jul. 30, 2013

(54) HONEYCOMB STRUCTURE AND METHOD FOR MANUFACTURING THE SAME

(75) Inventors: Yasushi Noguchi, Nagoya (JP); Yukari Nakane, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 807 days.

(21) Appl. No.: 12/559,088

(22) Filed: Sep. 14, 2009

(65) Prior Publication Data

US 2010/0086731 A1  Apr. 8, 2010

(30) Foreign Application Priority Data

Oct. 8, 2008  (JP) .................. 2008-261278

(51) Int. Cl.
- *B01D 39/20* (2006.01)
- *C04B 35/01* (2006.01)
- *F01N 3/022* (2006.01)
- *B28B 3/20* (2006.01)

(52) U.S. Cl.
USPC ............. 428/116; 264/631; 55/523; 501/123; 501/125

(58) Field of Classification Search
USPC ............. 428/116–118, 628; 55/523; 422/180; 501/123, 125, 141
See application file for complete search history.

(56) References Cited

U.S. PATENT DOCUMENTS

| | | | | |
|---|---|---|---|---|
| 3,954,672 A | * | 5/1976 | Somers et al. | 502/80 |
| 4,745,092 A | * | 5/1988 | Prunier, Jr. | 501/119 |
| 5,592,925 A | * | 1/1997 | Machida et al. | 123/568.11 |
| 2002/0192151 A1 | | 12/2002 | Kawazu et al. | |
| 2003/0041574 A1 | | 3/2003 | Noguchi et al. | |
| 2004/0112024 A1 | | 6/2004 | Noguchi et al. | |
| 2004/0166035 A1 | | 8/2004 | Noda et al. | |
| 2005/0232852 A1 | | 10/2005 | Kawazu et al. | |
| 2007/0105707 A1 | | 5/2007 | Ichikawa | |
| 2008/0155952 A1 | * | 7/2008 | Okazaki et al. | 55/523 |

FOREIGN PATENT DOCUMENTS

| | | |
|---|---|---|
| JP | A-61-178038 | 8/1986 |
| JP | A-11-92215 | 4/1999 |
| JP | A-2002-219319 | 8/2002 |
| JP | A-2002-301323 | 10/2002 |
| JP | A-2003-033664 | 2/2003 |
| JP | A-2003-63854 | 3/2003 |
| JP | A-2007-152342 | 6/2007 |

* cited by examiner

*Primary Examiner* — Jennifer McNeil
*Assistant Examiner* — Nicholas W Jordan
(74) *Attorney, Agent, or Firm* — Oliff & Berridge, PLC (57) ABSTRACT

A honeycomb structure 10 of the present invention is provided with porous partition walls 12 made of a ceramic material containing cordierite as a main crystal phase and separating and forming a plurality of cells 14 functioning as fluid passages. The partition walls 12 contain sodium at 0.08 to 0.15 mass % in terms of sodium oxide. A honeycomb structure having a large average pore size can be provided.

12 Claims, 4 Drawing Sheets

HONEYCOMB STRUCTURE AND METHOD FOR MANUFACTURING THE SAME

BACKGROUND OF THE INVENTION AND RELATED ART STATEMENT

The present invention relates to a honeycomb structure and a method for manufacturing the honeycomb structure. More specifically, the present invention relates to a honeycomb structure capable of serving as a honeycomb catalyst body used for purifying target components to be purified contained in exhaust gas discharged from an engine and the like of an automobile by loading a catalyst.

In various kinds of fields such as chemistry, electric power, iron and steel, a ceramic honeycomb structure excellent in thermal resistance and corrosion resistance is employed as a carrier for a catalyst apparatus used for an environmental measure or collection of specific substances or a filter (see, for example, JP-A-2003-33664).

Figure 4:
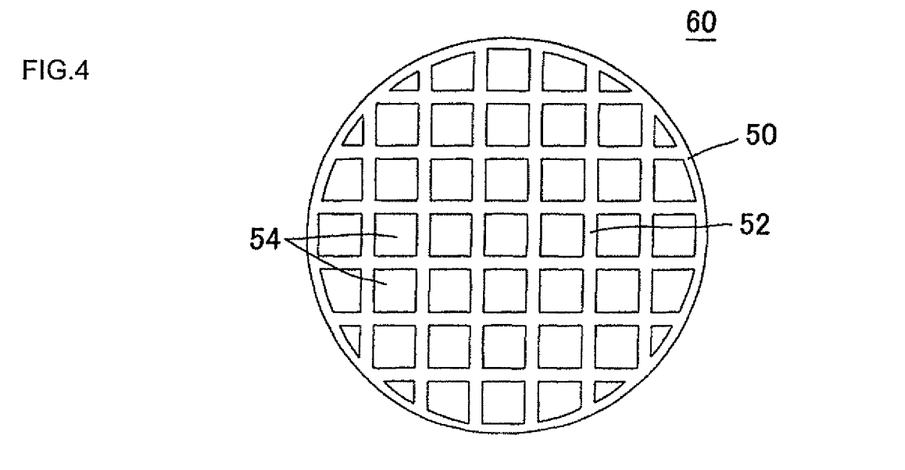
FIG. 4 is a plan view schematically showing an end face of a honeycomb catalyst body using a conventional honeycomb structure.
Figure 5:
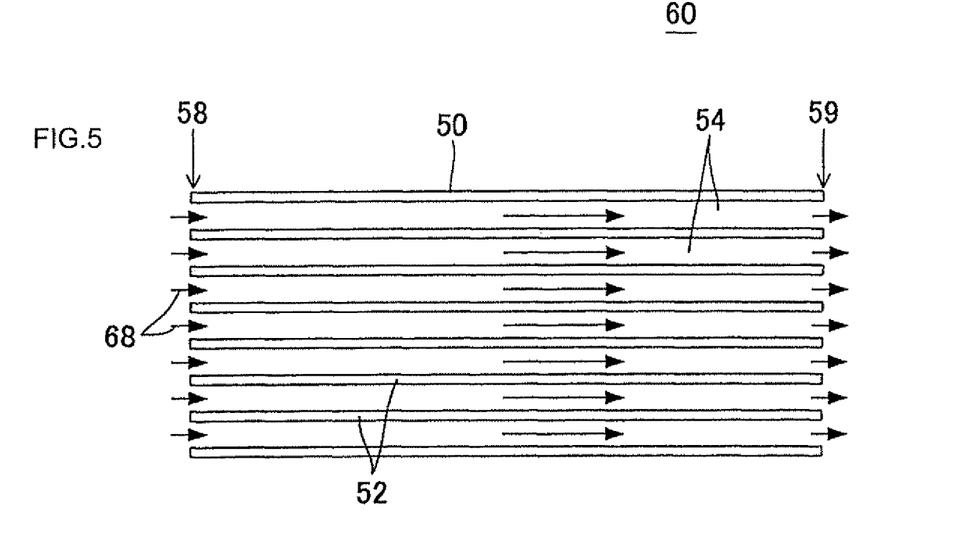
FIG. 5 is a cross-sectional view schematically showing a cross section in parallel with the flow passage direction of the cells in a honeycomb catalyst body shown in FIG. 4.
Figure 6:
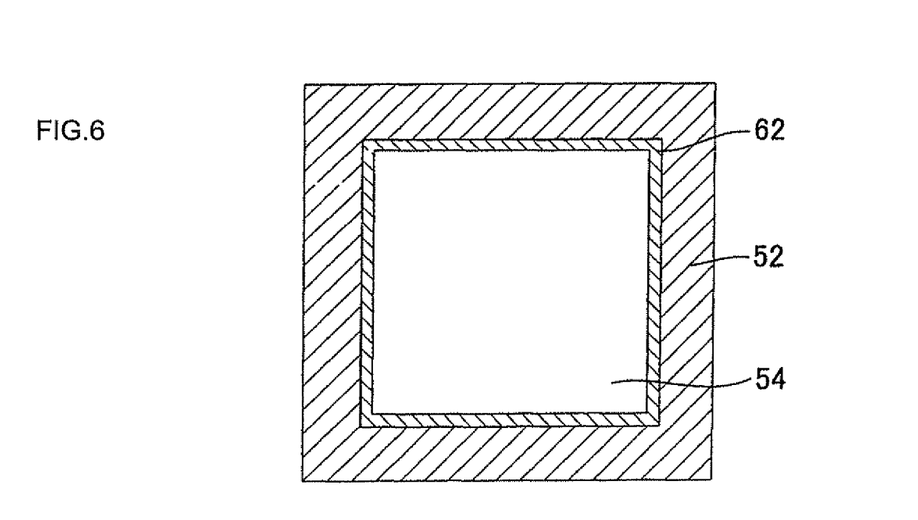
FIG. 6 is an enlarged cross-sectional view of a cross section perpendicular to the flow passage direction of the cells in a honeycomb catalyst body shown in FIG. 4.

For example, in order to purify exhaust gas discharged from various kinds of engines and the like, there is used a catalyst body (hereinbelow sometimes referred to as a "honeycomb catalyst body") obtained by loading a catalyst on a honeycomb structure. As shown in FIGS. 4 to 6, such a honeycomb catalyst body 60 using a honeycomb structure 50 is provided with a honeycomb structure 50 having partition walls 52 separating and forming a plurality of cells 54 functioning as fluid passages and a catalyst layer 62 formed by loading a catalyst on the surfaces of the partition walls 52.

As shown in FIGS. 4 and 5, in the case of purifying exhaust gas 68 using such a honeycomb catalyst body 60, the exhaust gas 68 is allowed to flow into the cells 54 from the end face 58 side on one side of the honeycomb catalyst body 60 and brought into contact with the catalyst layer 62 (see FIG. 6) on the surfaces of the partition walls 52 to purify the target components to be purified in the exhaust gas, and then discharged outside from the other end face 59 side.

In the case of purifying exhaust gas using a catalyst body using a honeycomb structure, in order to improve purification efficiency, it is preferable to make a cell hydraulic diameter small and a surface area of the partition wall large to promote transmission of the target components to be purified contained in the exhaust gas from the exhaust gas to the catalyst layer on the surfaces of the partition walls as much as possible.

In order to realize this, there is employed a method where the number of cells per unit area (also referred to as a cell density) is increased. It has been known that the transmission rate of the target components to be purified from the exhaust gas to the catalyst layer on the surfaces of the partition walls increases inversely with the square of cell hydraulic diameter. Therefore, the more the cell density is increased, the more the transmission rate of the target components to be purified is improved. However, since pressure loss also increases inversely with the square of cell hydraulic diameter, there arises a problem of increase in pressure loss in accordance with the rise in transmission rate of the target components to be purified. Therefore, in order to reduce the increase in pressure loss of a honeycomb structure used for a honeycomb catalyst body, various kinds of measures are performed.

In addition, in the case that diffusion speed of the target components to be purified is insufficient in the catalyst layer, purification efficiency tends to decrease in the honeycomb catalyst body. Therefore, in order to enhance purification efficiency for the exhaust gas, it is preferable to reduce the thickness of the catalyst layer, which is generally about tens of micrometers, on the surfaces of the partition walls besides to increase the surface area of the catalyst layer to improve the diffusion speed of the target components to be purified in the catalyst layer. It enables to easily increase the cell density and the surface area of the catalyst layer, thereby improving the transmission rate of the target components to be purified. However, such a method does not solve the problem of the increase in pressure loss.

Further, by increasing the inflow diameter of the honeycomb catalyst body and reducing the flow rate of the exhaust gas to be circulated, the pressure loss can be reduced while maintaining or raising the purification efficiency of the exhaust gas. However, in the case that a honeycomb catalyst body is large, a problem of difficulty in mounting the honeycomb catalyst body on an automobile remains since the space for mounting is limited.

Therefore, in order to reduce the increase of pressure loss of a honeycomb structure used for a honeycomb catalyst body, various kinds of measures are performed (see, for example, JP-A-2002-219319, JP-A-2002-301323, and JP-A-2007-152342).

However, in the methods described in JP-A-2002-219319, JP-A-2002-301323, and JP-A-2007-152342, the increase in pressure loss of the honeycomb structure is not sufficiently reduced, and development of a honeycomb structure having a large average pore size with which the increase in pressure loss can effectively be reduced has been desired.

SUMMARY OF THE INVENTION

The present invention has been made in view of such problems of the prior art and aims to provide a honeycomb structure having a large average pore size with which the increase in pressure loss can effectively be reduced and a method for manufacturing the honeycomb structure.

As a result of earnest investigation in order to solve the aforementioned problems of the prior art, the present inventor hit upon the idea that, in a honeycomb structure manufactured by forming kneaded clay containing a cordierite-forming raw material, using a material containing a predetermined amount of a sodium component as the cordierite-forming raw material solves the above problems because the sodium component accelerates the liquid phase reaction to increase the average pore size of the honeycomb structure, which lead to the present invention. Specifically, according to the present invention, there are provided the following honeycomb structure and the method for manufacturing the honeycomb structure.

[1] A honeycomb structure comprising porous partition walls made of a ceramic material containing cordierite as a main crystal phase and separating and forming a plurality of cells functioning as fluid passages, wherein the partition walls contain sodium at 0.08 to 0.15 mass % in terms of sodium oxide.

[2] A honeycomb structure according to the above [1], wherein the ceramic material contains at least a first alumina source containing sodium at 0.4 to 1.0 mass % in terms of sodium oxide as an alumina source for the cordierite.

[3] A honeycomb structure according to the above [1] or [2], wherein a ratio (W/X) of a thickness W (μm) of the partition walls to an average pore size X (μm) of pores formed in the partition walls is less than 3.0.

[4] A honeycomb structure according to any one of the above [1] to [3], wherein the partition walls have a thickness of 100 to 300 μm.

[5] A honeycomb structure according to any one of the above [1] to [4], wherein the partition walls have a porosity of 59 to 67% and an average pore size of 30 to 110 μm.

[6] A honeycomb structure according to any one of the above [1] to [5], wherein a thermal expansion coefficient at 40 to 800° C. is $0.5 \times 10^{-6}$ to $0.9 \times 10^{-6}$/° C.

[7] A method for manufacturing a honeycomb structure comprising the steps of: preparing kneaded clay for forming made of a ceramic raw material containing a cordierite-forming raw material, and forming the kneaded clay into a honeycomb shape where a plurality of cells functioning as fluid passages are separated and formed to obtain an unfired honeycomb formed article; wherein a material containing sodium at 0.08 to 0.15 mass % in terms of sodium oxide with respect to the total mass of the ceramic raw material is used as the ceramic raw material.

[8] A method for manufacturing a honeycomb structure according to the steps of [7], wherein a material containing at least a first alumina source containing sodium at 0.4 to 1.0 mass % in terms of sodium oxide is used as an alumina source for the cordierite-forming raw material.

In a honeycomb structure of the present invention, the average pore size of the honeycomb structure can be increased even without using a raw material powder having a large particle size or a pore former having a large particle size. Specifically, upon the cordierite-forming reaction of the cordierite-forming raw material, the sodium components accelerate the liquid phase reaction to increase the average pore size of the honeycomb structure.

In addition, in a honeycomb structure of the present invention, the porosity of the partition walls can be increased. Further, as described above, since the average pore size can be increased even without using a raw material powder having a large particle size or a pore former having a large particle size, the slits in the die for extrusion-forming of kneaded clay are hardly clogged, and therefore, thinning of the partition walls can be realized while increasing the average pore size.

In the method for manufacturing a honeycomb structure of the present invention, since a formed article can be obtained by the use of kneaded clay made of a raw material powder having a relatively small particle size, the slits in the die for forming are hardly clogged, which enables high-yield manufacture of a honeycomb structure having a large average pore size.

DESCRIPTION OF REFERENCE NUMERALS 10, 10a: honeycomb structure, 12: partition wall, 14: cell, 14a: predetermined cells, 14b: the other cells, 16: plugging portion, 18: one end face, 19: the other end face, 22, 23: catalyst layer, 22a, 23a: catalyst, 26: pore, 50: honeycomb structure, 52: partition wall, 54: cell, 60: honeycomb catalyst body, 62: catalyst layer, 68: exhaust gas

DETAILED DESCRIPTION OF THE INVENTION

Hereinbelow, the best embodiment for carrying out the present invention will specifically be described. However, the present invention is by no means limited to the following embodiment, and it should be understood that changes, improvements, and the like of the design may appropriately be made on the basis of ordinary knowledge of a person of ordinary skill within the range of not deviating from the gist of the present invention.

Figure 1:
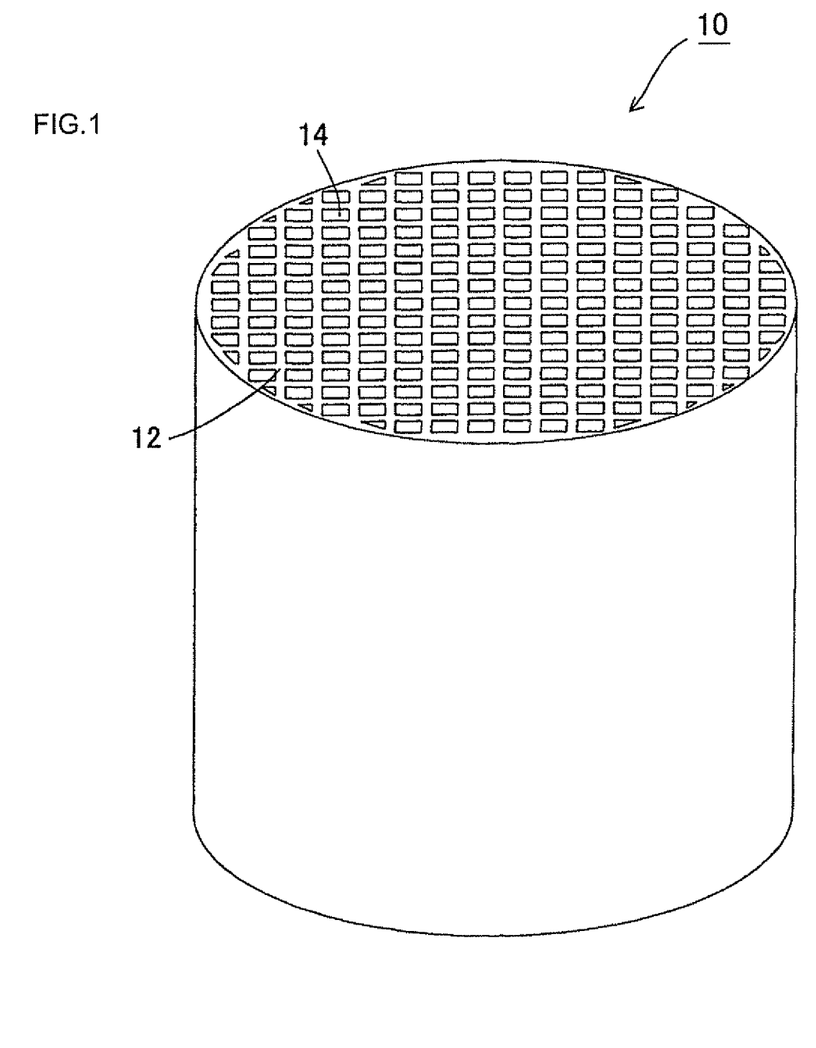
FIG. 1 is a perspective view schematically showing one embodiment of a honeycomb structure of the present invention.

[1] Honeycomb Structure:

First, one embodiment of a honeycomb structure of the present invention will specifically be described. As shown in FIG. 1, a honeycomb structure of the present embodiment is a cordierite honeycomb structure 10 provided with porous partition walls 12 made of a ceramic material containing cordierite as a main crystal phase and separating and forming a plurality of cells 14 functioning as fluid passages. Here, FIG. 1 is a perspective view schematically showing one embodiment of a honeycomb structure of the present invention.

The aforementioned cordierite is a ceramic made from a raw material where silica ($SiO_2$), alumina ($Al_2O_3$), and magnesia) (MgO) are blended to have a chemical composition of 42 to 56 mass %, 30 to 45 mass %, and 12 to 16 mass %, respectively. Specifically, the cordierite can be obtained by firing a ceramic raw material containing a plurality of inorganic raw materials selected from the group consisting of, for example, alumina, aluminum hydroxide, talc, silica, and kaolin at a ratio given by the aforementioned chemical composition.

Incidentally, the aforementioned "main crystal phase" means the crystal phase constituting 50 mass % or more, preferably 70 mass % or more, and more preferably 80 mass % or more in the crystal phase of the ceramics constituting the partition walls.

In a honeycomb structure of the present embodiment, the partition walls of a ceramic material containing cordierite as the main crystal phase contain sodium at 0.08 to 0.15 mass % in terms of sodium oxide. That is, as the ceramic raw material for forming the partition walls, a material containing sodium at 0.08 to 0.15 mass % in terms of sodium oxide is used.

By such constitution, in a honeycomb structure of the present embodiment, the average pore size can be increased even without using a raw material powder having a large particle size or a pore former having a large particle size. Specifically, upon the cordierite-forming reaction of the cordierite-forming raw material which becomes cordierite by firing, the sodium components accelerate the liquid phase reaction to increase the average pore size of the honeycomb structure.

In addition, in a honeycomb structure of the present embodiment, the porosity of the partition walls can be increased. Further, since the average pore size can be increased even without using a raw material powder having a large particle size or a pore former having a large particle size, the slits of the die for extrusion-forming of kneaded clay are hardly clogged, and therefore, thinning of the partition walls can be realized while increasing the average pore size.

Incidentally, when the content rate of the sodium in the partition walls is below 0.08 mass % in terms of sodium oxide, an effect in increasing the average pore size cannot sufficiently be obtained. On the other hand, when the content rate of the sodium in the partition walls exceeds 0.15 mass %, the partition walls constituting the honeycomb structure melt, and a honeycomb structure cannot be manufactured. Incidentally, the content rate of sodium in the partition walls in terms of sodium oxide can be obtained by converting the sodium amount measured by the fluorescent X-ray analysis into the sodium oxide amount.

Incidentally, the content rate of sodium in the partition walls in terms of sodium oxide is preferably 0.10 to 0.15 mass %, more preferably 0.12 to 0.15 mass % though it is not particularly limited.

A honeycomb structure of the present embodiment can suitably be used as a catalyst carrier for a honeycomb catalyst body used for purifying target components to be purified such as carbon monoxide (CO), hydrogen carbonate (HC), nitrogen oxides ($NO_x$), and sulfur oxides ($SO_x$) contained in exhaust gas discharged from a stationary engine for an automobile, a construction machine, or an industry; a combustion appliance; and the like.

As described above, a honeycomb structure of the present embodiment is made from a material containing cordierite as the main crystal phase, however it may contain other crystal phases of, for example, mullite, zircon, aluminum titanate, clay-bonded silicon carbide, zirconia, spinel, indialite, sapphirine, corundum, and titania. These crystal phases may be contained alone or as a combination of two or more kinds.

In addition, in a honeycomb structure of the present embodiment, it is preferable that the ceramic material containing cordierite as the main crystal phase contains at least a first alumina source containing sodium at 0.4 to 1.0 mass % in terms of sodium oxide as an alumina source for the cordierite. By such a constitution, since the sodium component in the aluminum oxide reacts at relatively high temperature to make cordierite formation proceed, a glass phase containing the sodium component, which causes high thermal expansion, is hardly formed, and a low thermal expansion coefficient of the honeycomb structure can be realized.

Incidentally, the first alumina source contains sodium at more preferably 0.4 to 1.0 mass %, particularly preferably 0.7 to 1.0 mass %, in terms of sodium oxide.

In addition, the total amount of the sodium component contained in the first alumina source is preferably 70 to 100 mass %, more preferably 80 to 100 mass %, with respect to the total amount of the sodium component contained in the ceramic material. For example, when the rate of sodium component contained in the first alumina source to the total sodium component amount is too low, the aforementioned effect in lowering the thermal expansion of the honeycomb structure may be decreased. Incidentally, the aforementioned total sodium component amount means the total amount of sodium in terms of sodium oxide.

Examples of the alumina source for the cordierite include alumina, aluminum hydroxide, activated alumina, and boehmite ($Al_2O_3 \cdot H_2O$). In addition, kaolin ($Al_2O_3 \cdot 2SiO_2 \cdot 2H_2O$) and mullite ($3Al_2O_3 \cdot 2SiO_2$) may be used as the alumina source.

In a honeycomb structure of the present embodiment, as the alumina sources for the cordierite serving as the main crystal phase, the ceramic material may contain, for example, one alumina containing sodium at 0.4 to 1.0 mass % in terms of sodium oxide (namely, first alumina source) and another alumina containing sodium out of the aforementioned range in terms of sodium oxide (for example, second alumina source). In addition, the ceramic material may contain still another alumina source such as aluminum hydroxide.

Incidentally, the first alumina source is not limited to alumina. For example, in the case that aluminum hydroxide contains sodium at 0.4 to 1.0 mass % in terms of sodium oxide, the aluminum hydroxide functions as the aforementioned first alumina source.

In a honeycomb structure of the present embodiment, it is preferable that a ratio (W/X) of a partition wall thickness W (μm) to an average pore size X (μm) of pores formed in the partition walls is less than 3.0. Since, in a honeycomb structure of the present embodiment, the average pore size of the honeycomb structure can be increased even without using a raw material powder having a large particle size or a pore former having a large particle size, even if the width of the slits formed in the die for extrusion-forming of the honeycomb structure is reduced, the raw material particles hardly get stuck in the slits of the die, and clogging of the slits can effectively be inhibited. Therefore, a honeycomb structure where the average pore size of the partition walls is one third or more of the thickness of the partition wall thickness can easily be manufactured with high yield.

For example, in a conventional honeycomb structure, the average pore size cannot be increased without using a raw material powder having a large particle size or a pore former having a large particle size because of the manufacturing method thereof, and when the average pore size is increased and the partition wall thickness is decreased, the die for forming get clogged. Therefore, it has conventionally been extremely difficult to continuously manufacture a honeycomb structure where the ratio (W/X) of a partition wall thickness W (μm) to an average pore size X (μm) in the partition walls is less than 3.0 with high yield. That is, in a conventional manufacturing method of a conventional honeycomb structure, the thinning of the partition walls and the increase in the average pore size are of warring concepts, and it has extremely been difficult to satisfy both of them at the same time.

Incidentally, in a honeycomb structure of the present embodiment, the ratio (W/X) of a partition wall thickness W (μm) to an average pore size X (μm) in the partition walls is more preferably 2.5 to 3.0, particularly preferably 2.5 to 2.8.

In addition, in a honeycomb structure of the present embodiment, the partition walls have a thickness of preferably 100 to 300 μm, more preferably 100 to 200 μm, particularly preferably 100 to 150 μm. In a conventional honeycomb structure, there is a limitation on increasing the average pore size in such thin partition walls. However, in a honeycomb structure of the present embodiment, the average pore size can be increased even in such thin partition walls.

In addition, in a honeycomb structure of the present embodiment, it is preferable that the partition walls have a porosity of 46 to 67% and an average pore size of 26 to 110 μm.

Incidentally, the porosity of the partition walls is more preferably 50 to 67%, particularly preferably 55 to 67%. In addition, the average pore size in the partition walls is more preferably 30 to 110 μm, particularly preferably 50 to 110 μm. Thus, in a honeycomb structure of the present embodiment, all of the thinning of the partition walls, the increase in the average pore size, and the increase in the porosity can be satisfied at the same time, which has conventionally been difficult.

The "average pore size" in the present specification is a value measured by the mercury porosimetry. In addition, the "porosity" is a porosity calculated from the whole pore volume measured by the mercury porosimetry. For example, the average pore size can be measured by the porosimeter of a mercury porosimetry type produced by Micromeritics Instrument Corporation.

In addition, in a honeycomb structure of the present embodiment, the thermal expansion coefficient at 40 to 800° C. is preferably $0.5 \times 10^{-6}$ to $0.9 \times 10^{-6}$/° C., more preferably $0.5 \times 10^{-6}$ to $0.8 \times 10^{-6}$/° C., particularly preferably $0.5 \times 10^{-6}$ to $0.7 \times 10^{-6}$/° C. By such a constitution, the thermal shock resistance can be enhanced. For example, when the thermal expansion coefficient at 40 to 800° C. exceeds $0.9 \times 10^{-6}$/° C., thermal shock resistance may be deteriorated.

The shape of a honeycomb structure of the present embodiment is not particularly limited. For example, the shape of across section (shape of a bottom face) perpendicular to the central axis of the columnar structure of the honeycomb structure may be a polygon such as a quadrangle, a circle, an ellipse, an oval, or an irregular shape.

There is no particular limitation on a cell shape (a cell shape in a cross section perpendicular to a central axial direction of a honeycomb structure (cell extension direction)) in a honeycomb structure of the present embodiment, and examples of the shape include a triangle, a quadrangle, a hexagon, an octagon, a circle, and a combination thereof.

Figure 2:
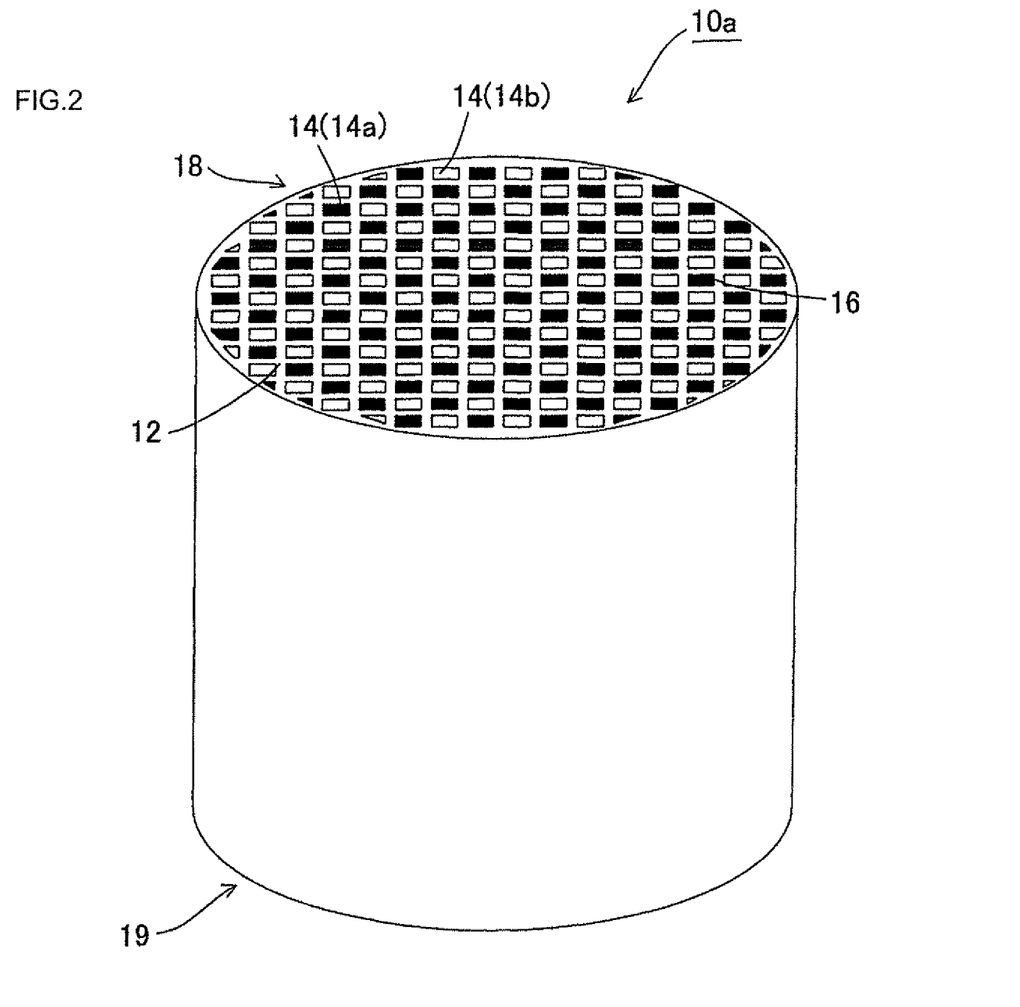
FIG. 2 is a perspective view schematically showing another embodiment of a honeycomb structure of the present invention.

In the case of using a honeycomb structure of the present embodiment as a catalyst carrier, for example, it may further be provided with plugging portions for plugging opening portions of cells on either one of the end faces. For example, FIG. 2 shows a honeycomb structure 10a further provided with plugging portions 16 where, among the cells 14 separated and formed by the partition walls 12, the opening portions on one end face 18 side in the predetermined cells 14a and the opening portions on the other end face 19 side in the other cells 14b are plugged. Here, FIG. 2 shows a perspective view schematically showing another embodiment of a honeycomb structure of the present invention.

Such plugging portions preferably have the same thermal expansion coefficient as that of the honeycomb structure, and cordierite plugging portions used in a conventional honeycomb structure can be employed. Also, plugging portions made of the same cordierite-forming raw material as that used in the honeycomb structure can be suitably employed.

Figure 3:
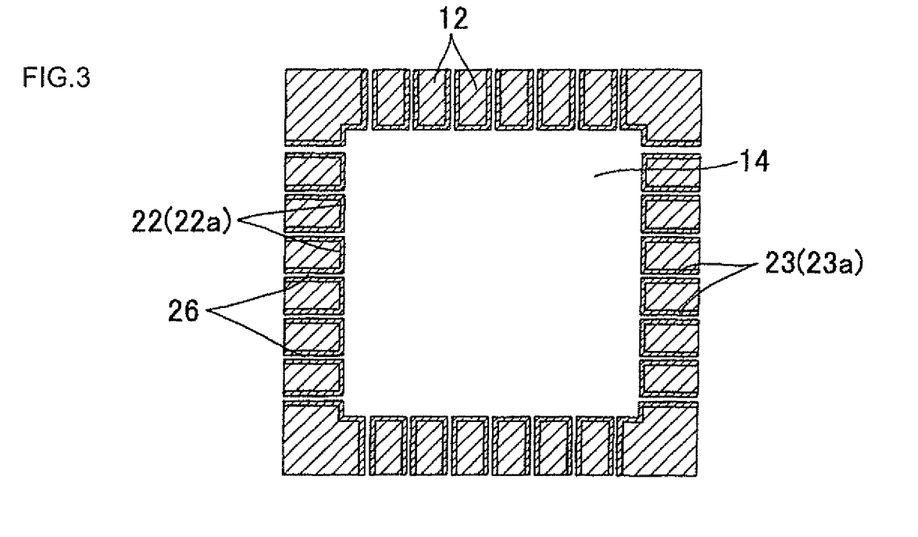
FIG. 3 is an enlarged cross-sectional view of a cross section perpendicular to the flow passage direction of the cells in a honeycomb catalyst body where a honeycomb structure of the present invention is applied.

A honeycomb structure of the present embodiment can be used as a catalyst body for purifying target components to be purified such as carbon monoxide contained in exhaust gas by loading a catalyst on the partition walls. For example, FIG. 3 shows an example where a catalyst layer 22 of a catalyst 22a loaded in layers on the inner surfaces of the partition walls 12 separating and forming the cells 14 and a catalyst layer 23 of a catalyst 23a loaded in layers on the inner surfaces of the pores 26 formed in the partition walls 12. Here, FIG. 3 is an enlarged cross-sectional view of a cross section perpendicular to the cell flow passage direction in a honeycomb catalyst body where a honeycomb structure of the present invention is applied.

Examples of such catalyst include a ternary catalyst for gasoline engine exhaust gas purification, an oxidation catalyst for gasoline engine or diesel engine exhaust gas purification, and an SCR catalyst for $NO_x$ selective reduction. Specific examples include a single body or compound containing a noble metal element such as platinum (Pt), rhodium (Rh), and palladium (Pd).

In general, when exhaust gas passes through certain passages, transmissibility of the target components to be purified contained in the exhaust gas inversely relates to the square of hydraulic diameter of the passages. In a honeycomb structure where a catalyst is loaded, the hydraulic diameter of the pores is far smaller than that of the cells. Therefore, in a honeycomb structure, the target components to be purified contained in exhaust gas is transmitted more easily to the catalyst layer (hereinbelow sometimes referred to as a "pore surface catalyst layer") of the catalyst loaded on the inner surfaces of the pores than to the catalyst layer (hereinbelow sometimes referred to as a "cell surface catalyst layer") of the catalyst loaded on the inner surfaces of the cells. Therefore, by increasing the amount of the catalyst (for example, the aforementioned noble metals) contained in the pore surface catalyst layer with respect to the amount of the catalyst contained in the cell surface catalyst layer, the exhaust gas purification efficiency can be improved.

[2] Method for Manufacturing Honeycomb Structure:

Next, an embodiment of a method for manufacturing a honeycomb structure of the present invention will specifically be described. A method for manufacturing a honeycomb structure of the present embodiment is a method for manufacturing the honeycomb structure of the present invention described above.

A method for manufacturing a honeycomb structure of the present embodiment is a method for manufacturing a honeycomb structure, the method being provided with a step of preparing kneaded clay for forming made of a ceramic raw material containing a cordierite-forming raw material and a step of forming the kneaded clay into a honeycomb shape where a plurality of cells functioning as fluid passages are separated and formed to obtain an unfired honeycomb formed article, and the method uses, as the aforementioned ceramic raw material, a material containing sodium at 0.08 to 0.15 mass % in terms of sodium oxide with respect to the total mass of the ceramic raw material.

In a method for manufacturing a honeycomb structure of the present embodiment, as shown in FIG. 1, there can be manufactured, by firing the aforementioned unfired honeycomb formed article, a honeycomb structure 10 provided with porous partition walls 12 made of kneaded clay containing a cordierite-forming raw material and separating and forming a plurality of cells 14 functioning as fluid passages.

A method for manufacturing a honeycomb structure of the present embodiment can make a honeycomb structure having a large average pore size. In particular, upon the cordierite-forming reaction of the cordierite-forming raw material, the sodium component accelerates the liquid phase reaction to increase the average pore size of the honeycomb structure. Therefore, a honeycomb formed article can be formed by the use of kneaded clay made of a raw material powder having a small particle size. This enables to inhibit clogging of the slits of the die for forming, and a honeycomb structure having a large average pore size as described above can be manufactured with high yield. In addition, as described above, since a raw material powder having a small particle size can be used, a honeycomb formed article having thin partition walls can be formed.

Hereinbelow, a method for manufacturing a honeycomb structure of the present embodiment will be described in more detail step by step.

In a method for manufacturing a honeycomb structure of the present embodiment, in the first place, kneaded clay for forming made of a ceramic raw material containing a cordierite-forming raw material is prepared. The ceramic raw material is a raw material for manufacturing a honeycomb structure having partition walls containing cordierite as a main crystal phase.

In the cordierite-forming raw material, since components giving a theoretical composition for a cordierite crystal are blended, an alumina source, a silica source, a magnesia source, and the like are blended together.

Examples of the alumina source of the cordierite-forming raw material include an alumina, aluminum hydroxide, activated alumina, and boehmite ($Al_2O_3.H_2O$). Particles of kaolin ($Al_2O_3.2SiO_2.2H_2O$), mullite ($3Al_2O_3.2SiO_2$), and the like can also be used as substances functioning as an alumina source and a silica source.

Examples of the silica source of the cordierite-forming raw material include particles of silica, a composite oxide containing silica, substances to be converted into silica by firing, and the like. Specific examples are particles of silica ($SiO_2$) including quartz, talc ($3MgO.4SiO_2.H_2O$), kaolin ($Al_2O_3.2SiO_2.2H_2O$), calcined kaolin, mullite ($3Al_2O_3.2SiO_2$), and the like. Incidentally, calcined kaolin can be obtained by calcining kaolin (raw kaolin) yielded as a mineral at a predetermined temperature, for example, 1000 to 1100° C.

Examples of the magnesia source of the cordierite-forming raw material include particles of magnesia, a composite oxide containing magnesia, substances to be converted into magnesia by firing, and the like. The aforementioned talc ($3MgO.4SiO_2.H_2O$) functions as the magnesia source, and in addition, for example, particles of magnesite ($MgCO_3$) or the like can be used. Incidentally, in a method for manufacturing a honeycomb structure of the present embodiment, talc particles are preferably used as the magnesia source.

A ceramic raw material for preparing kneaded clay for forming may further contain, besides the aforementioned cordierite-forming raw material, sodium carbonate ($Na_2CO_3$), for example, and, as pore formers, water-absorbing resin, a resin balloon, and carbon. Examples of the water absorbing resin include acryl-based water absorbing resin.

In a method for manufacturing a honeycomb structure of the present embodiment, it is necessary to select, as the ceramic raw material, a material containing sodium (specifically, sodium and sodium in a compound containing sodium) in each component constituting the ceramic raw material at 0.08 to 0.15 mass % in terms of sodium oxide (mass) with respect to the total mass of the ceramic raw material. For example, such a sodium component may be contained in at least one kind of a component selected from the group consisting of the alumina source, the silica source, and the magnesia source constituting the cordierite-forming raw material, or may be contained in a component other then the aforementioned cordierite-forming raw material. Incidentally, the aforementioned sodium component means metal sodium and a compound containing sodium in the constituents thereof, for example, sodium oxide and sodium carbonate. The content rate of the sodium in the ceramic raw material in terms of sodium oxide can be obtained by converting the sodium amount measured by fluorescent X-ray analysis into the sodium oxide amount.

Incidentally, this ceramic raw material contains sodium at preferably 0.10 to 0.15 mass %, more preferably 0.12 to 0.15 mass % in terms of sodium oxide.

It is preferable that this ceramic raw material employs, as the alumina source of the aforementioned cordierite-forming raw material, a material containing at least a first alumina source containing sodium at 0.4 to 1.0 mass % in terms of sodium oxide. By such a constitution, since the sodium component contained in the alumina source reacts at relatively high temperature to make the cordierite formation proceed, a glass phase containing a sodium component which causes high thermal expansion is hardly formed, and a low thermal expansion coefficient of the honeycomb structure can be realized.

Incidentally, this first alumina source contains sodium at more preferably 0.4 to 1.0 mass %, particularly preferably 0.7 to 1.0 mass %, in terms of sodium oxide.

Such a ceramic raw material is mixed, water or the like is further added as a dispersion medium, followed by kneading to prepare kneaded clay. A known mixing and kneading method can be employed for the above mixing and kneading. As the mixing method, for example, a method such as premixing can be employed. The kneading of the kneaded clay can be performed by the use of, for example, a kneader or a vacuum kneader.

Next, the kneaded clay obtained as such is formed by a method such as extrusion-forming, injection-forming, or press-forming to obtain an unfired honeycomb formed article where a plurality of cells functioning as fluid passages are separated and formed. It is preferable to employ the extrusion-forming since continuous forming is easy, and, for example, a low thermal expansion property is obtained by orientating the cordierite crystal. The extrusion forming can be performed by the use of an apparatus such as a vacuum kneader, a ram extruder, or a biaxial screw type continuous extruder.

Next, as necessary, plugging portions are formed in opening portions of cells of the honeycomb formed article. Specifically, the plugging portions can be formed by masking a part of the cells on one end face of the unfired honeycomb formed article, and immersing the end face in a raw material for plugging stored in a storage container to fill the raw material for plugging into the cells without the mask.

Though the raw material for plugging may be the same as the material for the kneaded clay for forming the honeycomb formed article, a material having a different composition may be used. For example, a ceramic raw material, a surfactant, and water are mixed together, and a sintering auxiliary, a pore former, and the like are added to the mixture as necessary to obtain slurry. The slurry is kneaded by the use of a mixer or the like to obtain the material for plugging. Examples of the ceramic raw material among raw materials for the plugging portions include α-alumina, calcined bauxite, aluminum sulfate, aluminum chloride, aluminum hydroxide, rutile, anatase type titanium, ilmenite, electromelting magnesium, magnesite, electromelting spinel, kaolin, silica glass, quartz, and fused silica. Examples of the surfactant include fatty acid soap, fatty acid ester, and polyalcohol.

Next, the honeycomb formed article having plugging portions is dried. The honeycomb formed article can be dried by hot air drying, microwave drying, dielectric drying, reduced pressure drying, vacuum drying, and/or freeze drying. Since the whole can be dried quickly and uniformly, a combination of hot air drying and microwave drying or dielectric drying is preferable.

Next, the dried honeycomb formed article is fired. In the case of a honeycomb formed article using a cordierite-forming raw material, firing is usually performed at 1410 to 1440° C. for 3 to 15 hours in an ambient atmosphere. Incidentally, drying and firing may continuously be performed.

As described above, a honeycomb structure of the present invention can be manufactured. In a method for manufacturing a honeycomb structure of the present embodiment, upon the cordierite-forming reaction of the cordierite-forming raw material, a sodium component contained at a specified rate accelerates the liquid phase reaction and can increase the average pore size of the honeycomb structure. Therefore, even without using a raw material powder having a large particle size or a pore former having a large particle size, the average pore size of the honeycomb structure can be increased.

Incidentally, a honeycomb structure manufactured as described above can be used as a honeycomb catalyst body by loading a catalyst in the inner surfaces of the partition walls and in the inner surfaces of the pores formed in the partition walls. With regard to the catalyst to be loaded on the partition walls, there can suitably be used a catalyst containing the noble metal element described in the aforementioned embodiment of a honeycomb structure of the present invention. In addition, there is no particular limitation on the method for loading the catalyst, and loading can be performed in accordance with a known method for loading a catalyst on a honeycomb structure.

EXAMPLE

Hereinbelow, the present invention will be described more specifically with Examples. However, the present invention is by no means limited to these Examples. In addition, methods for measuring property values in the Examples are shown below.

[Pore size (μm)]: measured by a mercury porosimetry type porosimeter produced by Micromeritics Instrument Corporation.

[Porosity (%)]: calculated from the whole pore capacity by a mercury porosimetry type porosimeter produced by Micromeritics Instrument Corporation with controlling a true specific gravity of cordierite to 2.52 g/cm$^3$.

[Thermal expansion coefficient ($\times 10^{-6}$/° C.)]: measured in accordance with a method described in the Automotive Standard established by Society of Automotive Engineers of Japan Inc. Standard Organization: Test Method for Ceramic Monolith Carrier for Automobile Exhaust Gas Purification Catalyst (JASO M 505-87).

Example 1

As an alumina source, 30 parts by mass of alumina (referred to as "alumina 1" in Table 1) having a particle size of 20 μm and containing sodium at 0.4 mass % in terms of sodium oxide, 43 parts by mass of talc having a particle size of 30 μm and containing sodium at 0.01 mass % in terms of sodium oxide, and 22 parts by mass of silica having a particle size of 30 μm were mixed together to prepare a cordierite-forming raw material (100 parts by mass in total). Incidentally, in Table 1, the rate of sodium in each component in terms of sodium oxide is shown as "Na$_2$O amount (mass %)".

Next, to 100 parts by mass of the cordierite-forming raw material were added 6 parts by mass of acrylic water-absorbing resin having a particle size of 40 μm and 70 parts by mass of water, and they were mixed to obtain a ceramic raw material, which was then kneaded to obtain kneaded clay having plasticity.

Next, the kneaded clay was formed into a cylindrical shape by a vacuum kneader and then put in an extruder to obtain a honeycomb formed article having a honeycomb shape. Table 1 shows the blending formulation of the ceramic raw material. Incidentally, when the kneaded clay was formed, formation was performed in good conditions without clogging of the slits of the die with particles in the raw material.

Next, after the honeycomb formed article obtained above was subjected to dielectric drying, it was further dried by hot air drying. Both ends of the dried honeycomb formed article were cut to have predetermined dimensions. Then, the article was fired at 1420° C. for 5 hours to manufacture a honeycomb structure having a diameter of 100 mm, a length of 120 mm, a partition wall thickness of 100 μm, and a cell density of 37 cells/cm$^2$.

The honeycomb structure obtained above had an average pore diameter of 40 μm. In addition, the ratio (shown as "W/X" in Table 1) of the partition wall thickness W (μm) to the average pore size (μm) was 2.5, and the partition walls had a porosity of 65%. In addition, the honeycomb structure of Example 1 had a thermal expansion coefficient of $0.7 \times 10^{-6}$/° C. at 40 to 800° C.

TABLE 1

|  |  |  | Example 1 | Example 2 | Example 3 | Comp. Ex. 1 | Example 4 |
|---|---|---|---|---|---|---|---|
| Material | Alumina 1 | Amount (parts by mass) | 35 | 25 | 15 | — | — |
|  |  | Particle size (μm) | 20 | 20 | 20 | — | — |
|  |  | Na$_2$O amount (mass %) | 0.4 | 0.4 | 0.4 | — | — |
|  | Alumina 2 | Amount (parts by mass) | — | 10 | 20 | 35 | 14 |
|  |  | Particle size (μm) | — | 20 | 20 | 20 | 20 |
|  |  | Na$_2$O amount (mass %) | — | 0.1 | 0.1 | 0.1 | 0.1 |
|  | Aluminum hydroxide | Amount (parts by mass) | — | — | — | — | 28 |
|  |  | Particle size (μm) | — | — | — | — | 20 |
|  |  | Na$_2$O amount (mass %) | — | — | — | — | 0.4 |
|  | Talc | Amount (parts by mass) | 43 | 43 | 43 | 43 | 39 |
|  |  | Particle size (μm) | 30 | 30 | 30 | 30 | 30 |
|  |  | Na$_2$O amount (mass %) | 0.01 | 0.01 | 0.01 | 0.01 | 0.01 |
|  | Silica | Amount (parts by mass) | 22 | 22 | 22 | 22 | 19 |
|  |  | Particle size (μm) | 30 | 30 | 30 | 30 | 30 |
|  |  | Na$_2$O amount (mass %) | 0 | 0 | 0 | 0 | 0 |
|  | Sodium Carbonate (Na$_2$CO$_3$) | Amount (parts by mass) | — | — | — | — | — |
|  |  | Particle size (μm) | — | — | — | — | — |
|  |  | Na$_2$O amount (mass %) | — | — | — | — | — |
|  |  | Total (parts by mass) | 100 | 100 | 100 | 100 | 100 |
|  | Water-absorbing resin | Amount (parts by mass) | 6 | 6 | 6 | 6 | 6 |
|  |  | Particle size (μm) | 40 | 40 | 40 | 40 | 40 |
|  |  | Na$_2$O amount (mass %) | 0 | 0 | 0 | 0 | 0 |
|  |  | Total Na$_2$O (mass %) | 0.144 | 0.114 | 0.084 | 0.039 | 0.130 |
| Property |  | Partition wall thickness W (μm) | 100 | 100 | 100 | 100 | 100 |
|  |  | Cell density (cells/cm$^2$) | 37 | 37 | 37 | 37 | 40 |
|  |  | Pore size X (μm) | 40 | 34 | 31 | 21 | 39 |
|  |  | W/X | 2.5 | 2.9 | 3.2 | 4.8 | 2.6 |
|  |  | Porosity (%) | 65 | 66 | 64 | 65 | 67 |

TABLE 1-continued

|  |  |  |  |  |  |  |  |
|---|---|---|---|---|---|---|---|
|  | Thermal expansion coefficient (×10⁻⁶/° C.) | 0.7 | 0.7 | 0.6 | 0.5 | 0.6 |  |
|  | Formed condition | Good | Good | Good | Good | Good |  |

|  |  |  | Example 5 | Example 6 | Example 7 | Example 8 | Example 9 |
|---|---|---|---|---|---|---|---|
| Material | Alumina 1 | Amount (parts by mass) | — | — | 35 | 35 | 35 |
|  |  | Particle size (μm) | — | — | 35 | 30 | 40 |
|  |  | $Na_2O$ amount (mass %) | — | — | 0.4 | 0.4 | 0.4 |
|  | Alumina 2 | Amount (parts by mass) | 35 | 35 | — | — | — |
|  |  | Particle size (μm) | 20 | 20 | — | — | — |
|  |  | $Na_2O$ amount (mass %) | 0.1 | 0.1 | — | — | — |
|  | Aluminum hydroxide | Amount (parts by mass) | — | — | — | — | — |
|  |  | Particle size (μm) | — | — | — | — | — |
|  |  | $Na_2O$ amount (mass %) | — | — | — | — | — |
|  | Talc | Amount (parts by mass) | 43 | 43 | 43 | 43 | 43 |
|  |  | Particle size (μm) | 30 | 30 | 40 | 45 | 60 |
|  |  | $Na_2O$ amount (mass %) | 0.01 | 0.01 | 0.02 | 0.02 | 0.02 |
|  | Silica | Amount (parts by mass) | 22 | 22 | 22 | 22 | 22 |
|  |  | Particle size (μm) | 30 | 30 | 40 | 60 | 70 |
|  |  | $Na_2O$ amount (mass %) | 0.45 | 0 | 0 | 0 | 0 |
|  | Sodium Carbonate ($Na_2CO_3$) | Amount (parts by mass) | — | 0.17 | — | — | — |
|  |  | Particle size (μm) | — | 2 | — | — | — |
|  |  | $Na_2O$ amount (mass %) | — | 58 | — | — | — |
|  |  | Total (parts by mass) | 100 | 100.17 | 100 | 100 | 100 |
|  | Water-absorbing resin | Amount (parts by mass) | 6 | 6 | 6 | 6 | 6 |
|  |  | Particle size (μm) | 40 | 40 | 70 | 70 | 100 |
|  |  | $Na_2O$ amount (mass %) | 0 | 0 | 0 | 0 | 0 |
|  |  | Total $Na_2O$ (mass %) | 0.138 | 0.138 | 0.149 | 0.149 | 0.149 |
| Property |  | Partition wall thickness W (μm) | 100 | 100 | 150 | 200 | 300 |
|  |  | Cell density (cells/cm²) | 37 | 37 | 24 | 24 | 18 |
|  |  | Pore size X (μm) | 36 | 35 | 57 | 80 | 110 |
|  |  | W/X | 2.8 | 2.9 | 2.6 | 2.5 | 2.7 |
|  |  | Porosity (%) | 64 | 63 | 65 | 65 | 64 |
|  |  | Thermal expansion coefficient (×10⁻⁶/° C.) | 1.1 | 1.2 | 0.8 | 0.8 | 0.9 |
|  |  | Formed condition | Good | Good | Good | Good | Good |

Examples 2 to 15

Comparative Examples 1 to 3

Honeycomb structures were obtained in the same manner as in Example 1 except that the blending formulation of the ceramic raw material was changed as shown in Tables 1 and 2. Each of the honeycomb structures was subjected to the measurements and the evaluation in the same manner as in Example 1. The results are shown in Tables 1 and 2. Incidentally, since the honeycomb structure in Comparative Example 3 melted upon firing, the measurements could not be performed except for the evaluation of the formed condition.

TABLE 2

|  |  |  | Example 10 | Example 11 | Example 12 | Example 13 |
|---|---|---|---|---|---|---|
| Material | Alumina 1 | Amount (parts by mass) | 29 | 15 | 10 | 35 |
|  |  | Particle size (μm) | 20 | 20 | 20 | 20 |
|  |  | $Na_2O$ amount (mass %) | 0.4 | 0.7 | 1.0 | 0.4 |
|  | Alumina 2 | Amount (parts by mass) | — | 20 | 25 | — |
|  |  | Particle size (μm) | — | 20 | 20 | — |
|  |  | $Na_2O$ amount (mass %) | — | 0.1 | 0.1 | — |
|  | Talc | Amount (parts by mass) | 42 | 43 | 43 | 43 |
|  |  | Particle size (μm) | 30 | 30 | 30 | 30 |
|  |  | $Na_2O$ amount (mass %) | 0.02 | 0.01 | 0.01 | 0.01 |
|  | Silica | Amount (parts by mass) | 17 | 22 | 22 | 22 |
|  |  | Particle size (μm) | 30 | 30 | 30 | 30 |
|  |  | $Na_2O$ amount (mass %) | 0 | 0 | 0 | 0 |
|  | Kaolin | Amount (parts by mass) | 12 | — | — | — |
|  |  | Particle size (μm) | 10 | — | — | — |
|  |  | $Na_2O$ amount (mass %) | 0.05 | — | — | — |
|  |  | Total (parts by mass) | 100 | 100 | 100 | 100 |
|  | Water-absorbing resin | Amount (parts by mass) | 6 | 6 | 6 | 4 |
|  |  | Particle size (μm) | 40 | 40 | 40 | 40 |
|  |  | $Na_2O$ amount (mass %) | 0 | 0 | 0 | 0 |
|  |  | Total $Na_2O$ (mass %) | 0.130 | 0.129 | 0.129 | 0.144 |
| Property |  | Partition wall thickness W (μm) | 100 | 100 | 100 | 100 |
|  |  | Cell density (cells/cm²) | 37 | 37 | 37 | 36 |
|  |  | Pore size X (μm) | 31 | 37 | 38 | 35 |
|  |  | W/X | 3.2 | 2.7 | 2.6 | 2.9 |
|  |  | Porosity (%) | 65 | 63 | 64 | 59 |
|  |  | Thermal expansion | 0.6 | 0.7 | 0.8 | 0.6 |

TABLE 2-continued

| | | | Example 14 | Example 15 | Comp. Ex. 2 | Comp. Ex. 3 |
|---|---|---|---|---|---|---|
| Material | Alumina 1 | Amount (parts by mass) | 35 | 35 | — | 20 |
| | | Particle size (μm) | 20 | 20 | — | 20 |
| | | $Na_2O$ amount (mass %) | 0.4 | 0.4 | — | 0.7 |
| | Alumina 2 | Amount (parts by mass) | — | — | 35 | 15 |
| | | Particle size (μm) | — | — | 40 | 20 |
| | | $Na_2O$ amount (mass %) | — | — | 0.1 | 0.1 |
| | Talc | Amount (parts by mass) | 43 | 43 | 43 | 43 |
| | | Particle size (μm) | 30 | 30 | 30 | 30 |
| | | $Na_2O$ amount (mass %) | 0.01 | 0.01 | 0.01 | 001 |
| | Silica | Amount (parts by mass) | 22 | 22 | 22 | 22 |
| | | Particle size (μm) | 30 | 30 | 30 | 30 |
| | | $Na_2O$ amount (mass %) | 0 | 0 | 0 | 0 |
| | Kaolin | Amount (parts by mass) | — | — | — | — |
| | | Particle size (μm) | — | — | — | — |
| | | $Na_2O$ amount (mass %) | — | — | — | — |
| | | Total (parts by mass) | 100 | 100 | 100 | 100 |
| | Water-absorbing resin | Amount (parts by mass) | 2 | 0 | 6 | 6 |
| | | Particle size (μm) | 40 | 40 | 40 | 40 |
| | | $Na_2O$ amount (mass %) | 0 | 0 | 0 | 0 |
| | | Total $Na_2O$ (mass %) | 0.144 | 0.144 | 0.039 | 0.159 |
| Property | | Partition wall thickness W (μm) | 100 | 100 | 100 | Melt |
| | | Cell density (cells/cm$^2$) | 35 | 34 | 37 | |
| | | Pore size X (μm) | 31 | 26 | 31 | |
| | | W/X | 3.2 | 3.8 | 3.2 | |
| | | Porosity (%) | 53 | 46 | 65 | |
| | | Thermal expansion coefficient (×10$^{-6}$/° C.) | 0.5 | 0.5 | 0.7 | |
| | | Formed condition | Good | Good | Die clogging | Good |

(Results)

From Tables 1 and 2, each of the honeycomb structures of Examples 1 to 15, where a total sodium oxide content rate (that is, rate of sodium in terms of sodium oxide) is 0.08 to 0.15 mass %, had a larger average pore diameter than that of the honeycomb structure of Comparative Example 1. In Comparative Example 1, it can be considered that the pore size was not increased because the sodium oxide amount was too small to accelerate the liquid phase reaction upon the cordierite-forming reaction. In each of the honeycomb structures of Examples 1 to 15, high porosity could also be realized by using a pore former.

On the other hand, since the honeycomb structure of Comparative Example 2 employed alumina (shown as "alumina 2" in Table 2) having a large particle size (specifically, 40 μm) as an alumina source raw material, the average pore size of the partition walls could be increased even though the sodium oxide content rate was so low as 0.039 mass %. However, since the particle size of the alumina 2 was relatively large with respect to the gap (width) of the slits of the die for formation, the slits were clogged in a very short period of time, and extrusion forming could not be performed continuously. In Examples 1 to 15, since the pore size was increased due to the aforementioned liquid phase reaction, the partition wall thickness could be made small with respect to the average pore size. In particular, in Examples 1, 2, 4 to 9, and 11 to 13, the ratio (W/X) of the partition walls thickness (μm) with respect to the average pore size (μm) could be made below 3.0.

In addition, the honeycomb structure of Comparative Example 3, where the total sodium oxide content rate was above 0.15 mass %, melted upon firing. Thus, a honeycomb structure where a formed condition was maintained could not be obtained. This seems to be because the too much sodium oxide amount excessively accelerated the liquid phase reaction upon the cordierite-forming reaction in Comparative Example 3.

Further, in Examples 1 to 3 and 7 to 15, where alumina (alumina 1) having a sodium oxide content rate of 0.4 mass % was used, the thermal expansion coefficient was reduced. This seems to be because formation of a glass phase containing sodium oxide which causes high thermal expansion is inhibited since sodium oxide in the alumina (aluminum oxide) reacted at relatively high temperature to make cordierite formation proceed.

A honeycomb structure of the present invention can be used as a catalyst carrier for a honeycomb catalyst body used for purifying target components to be purified such as carbon monoxide (CO), hydrocarbon (HC), nitrogen oxides ($NO_x$), and sulfur oxides ($SO_x$) contained in exhaust gas discharged from a stationary engine for an automobile, a construction machine, or an industry; a combustion appliance; and the like. In addition, a method for manufacturing a honeycomb structure of the present invention can be used as a method for manufacturing such a honeycomb structure with high yield.

What is claimed is:

1. A honeycomb structure comprising porous partition walls made of a ceramic material containing cordierite as a main crystal phase and separating and forming a plurality of cells functioning as fluid passages, wherein a thermal expansion coefficient of the honeycomb structure at 40 to 800° C. is $0.5 \times 10^{-6}$ to $0.9 \times 10^{-6}$/° C., the partition walls contain sodium at 0.08 to 0.15 mass % in terms of sodium oxide, the partition walls were made from a cordierite-forming raw ceramic material containing at least a first alumina source containing sodium at 0.4 to 1.0 mass % in terms of sodium oxide as an alumina source for the cordierite, and formation of a glass phase containing sodium oxide is inhibited.

2. A honeycomb structure according to claim 1, wherein a ratio (W/X) of a thickness W (μm) of the partition walls to an average pore size X (μm) of pores formed in the partition walls is less than 3.0.

3. A honeycomb structure according to claim 2, wherein the partition walls have a thickness of 100 to 300 μm.

4. A honeycomb structure according to claim 2, wherein the partition walls have a porosity of 59 to 67% and an average pore size of 30 to 110 μm.

5. A honeycomb structure according to claim 2, wherein the thermal expansion coefficient at 40 to 800° is $0.5 \times 10^{-6}$ to $0.7 \times 10^{-6}/°C$.

6. A honeycomb structure according to claim 1, wherein the partition walls have a thickness of 100 to 300 μm.

7. A honeycomb structure according to claim 6, wherein the partition walls have a porosity of 59 to 67% and an average pore size of 30 to 110 μm.

8. A honeycomb structure according to claim 6, wherein a the thermal expansion coefficient at 40 to 800° is $0.5 \times 10^{-6}$ to $0.7 \times 10^{-6}/°C$.

9. A honeycomb structure according to claim 1, wherein the partition walls have a porosity of 59 to 67% and an average pore size of 30 to 110 μm.

10. A honeycomb structure according to claim 1, wherein the thermal expansion coefficient at 40 to 800° C. is $0.5 \times 10^{-6}$ to $0.7 \times 10^{-6}/°C$.

11. A honeycomb structure according to claim 1, wherein the partition walls have an average pore size of 50 to 110 μm.

12. A method for manufacturing a honeycomb structure comprising the steps of:
preparing kneaded clay for forming made of a ceramic raw material containing a cordierite-forming raw material containing at least a first alumina source containing sodium at 0.4 to 1.0 mass % in terms of sodium oxide as an alumina source, and
forming the kneaded clay into a honeycomb shape where a plurality of cells functioning as fluid passages are separated and formed to obtain an unfired honeycomb formed article; and
producing a honeycomb structure in which a glass phase containing sodium oxide is inhibited, wherein the honeycomb structure has a thermal expansion coefficient at 40 to 800° C. is $0.5 \times 10^{-6}$ to $0.9 \times 10^{-6}/°C$., and partition walls contain sodium at 0.08 to 0.15 mass % in terms of sodium oxide.

* * * * *